United States Patent [19]

Meyer

[11] Patent Number: 4,613,779
[45] Date of Patent: Sep. 23, 1986

[54] ELECTRICAL PULSE GENERATOR

[76] Inventor: Stanley A. Meyer, 3792 Broadway, Grove City, Ohio 43213

[21] Appl. No.: 518,534

[22] Filed: Jul. 29, 1983

[51] Int. Cl.$^4$ ............................................. H02K 16/00
[52] U.S. Cl. ...................................... 310/112; 310/46; 310/267; 310/114; 310/126
[58] Field of Search ................. 310/46, 267, 112, 114, 310/126, 266

[56] References Cited

U.S. PATENT DOCUMENTS

| | | | |
|---|---|---|---|
| 120,057 | 10/1871 | Gramme et al. | 310/267 X |
| 218,520 | 8/1879 | Gramme | 310/267 X |
| 3,396,296 | 8/1968 | Esters | 310/46 X |
| 3,535,566 | 10/1970 | Smith | 310/267 X |

*Primary Examiner*—Donovan F. Duggan

[57] ABSTRACT

An electrical pulse generator comprising a series of electromagnets spatially positioned about the outer circumference of a disc-like base and a second series of complimentary electromagnets positioned about an inner position on said disc. One of each of said first and second series electromagnets positioned relative to each other creating a magnetic field therebetween. A second disc-like base rotatable above and parallel with said first disc. A continuous coil winding ring mounted on the underside of said second disc and positioned relative to said first and second series of electromagnets to traverse said magnetic field upon rotation of said second disc and thereby inducing a voltage/current potential in said coil winding.

20 Claims, 5 Drawing Figures

ELECTRICAL PULSE GENERATOR

BACKGROUND

Power supplies for electrical systems have been utilized for a century or so. As time progressed new uses of electrical systems placed a need for more sophisticated systems.

One particular utilization is the need for power transfer to the utilization device but yet with the requirement that there be power isolation.

The advancement of electronics and power devices such as SCRs, Triacs and the such, appeared to be an obvious solution to such a power transfer. Current limiting circuits also were developed. Unfortuneately, the solution was not met. The electronic devices in most instances could not limit or tolerate high power.

Finally, it became apparent that the electrical systems, with this type of current limiting requirement necessitated electrical power supplies—not electronic.

A very uneffective device is the auto alternator that will provide an increased power output with limited current. However this device, too, with it's sufferings, such as opposing magnetic fields, rubbing contacts and the such, made this device very inefficient.

SUMMARY OF INVENTION

The electrical generator of the present invention is a substantial improvement of the state of the art in power isolation and power transfer and particularly the conventional alternator. A practical working embodiment has no contacts and no opposing magnetic fields. Also of equal significance is that the voltage output is variably dependant on several controllable features.

The structure comprises a series of electromagnets positioned on the outer periphery of a stationary disc. A second series of electromagnets are positioned about the inner circumference of the stationary disc. One of each of said first and second series of electromagnets are positioned relative to one another to create a magnetic field therebetween when energized.

A second disc has positioned on its underside a winding coil having a non-magnetic ring with a continuous winding thereon, extending downwardly between said first and second series of electromagnets. The winding is positioned between the first and second series of electromagnets in the magnetic field created thereby. Upon rotation of the second disc the continuous winding on the ring traverses the magnetic fields and in turn the magnetic fields induce a voltage in the windings on the ring.

In a preferred embodiment, a third and fourth series of electromagnets are positioned on the upper side of the rotatable disc much in the same manner as the first and second series of electromagnets positioned on said first stationary disc. The voltage/current induced in said first ring winding is utilized to energize said third and fourth electromagnets to create a second magnetic field therebetween.

The second non-magnetic ring traverses the second magnetic field, causing an electrical potential for utilization. The apparatus does not have contact rings or brushes, nor are there opposing magnetic forces. Similar arrangements are cascaded for voltage multiplication. Multiple windings on each ring provide independant outputs for multiple utilization devices.

OBJECTS

It is a principal object of the present invention to provide an electrical arrangement that is power isolated but yet, permits increased power transfer to a utilization device.

Another object of the present invention is to provide such an electrical system that is free of opposing magnetic fields, contacts, slip rings, moving wires, and the like.

Another object of the present invention is to provide such an electrical system that has an output potential that may be varied in magnitude.

Another object of the present invention is to provide a structure that is not affected in size and that may be duplicated in cascade for high power outputs.

Still another object of the present invention is to provide a winding ring having induced therein multiple discrete voltages.

Other objects and features will become apparent from a detailed description of the invention when taken in conjunction with the drawings in which:

DETAILED DESCRIPTION OF DRAWINGS

Figure 1:
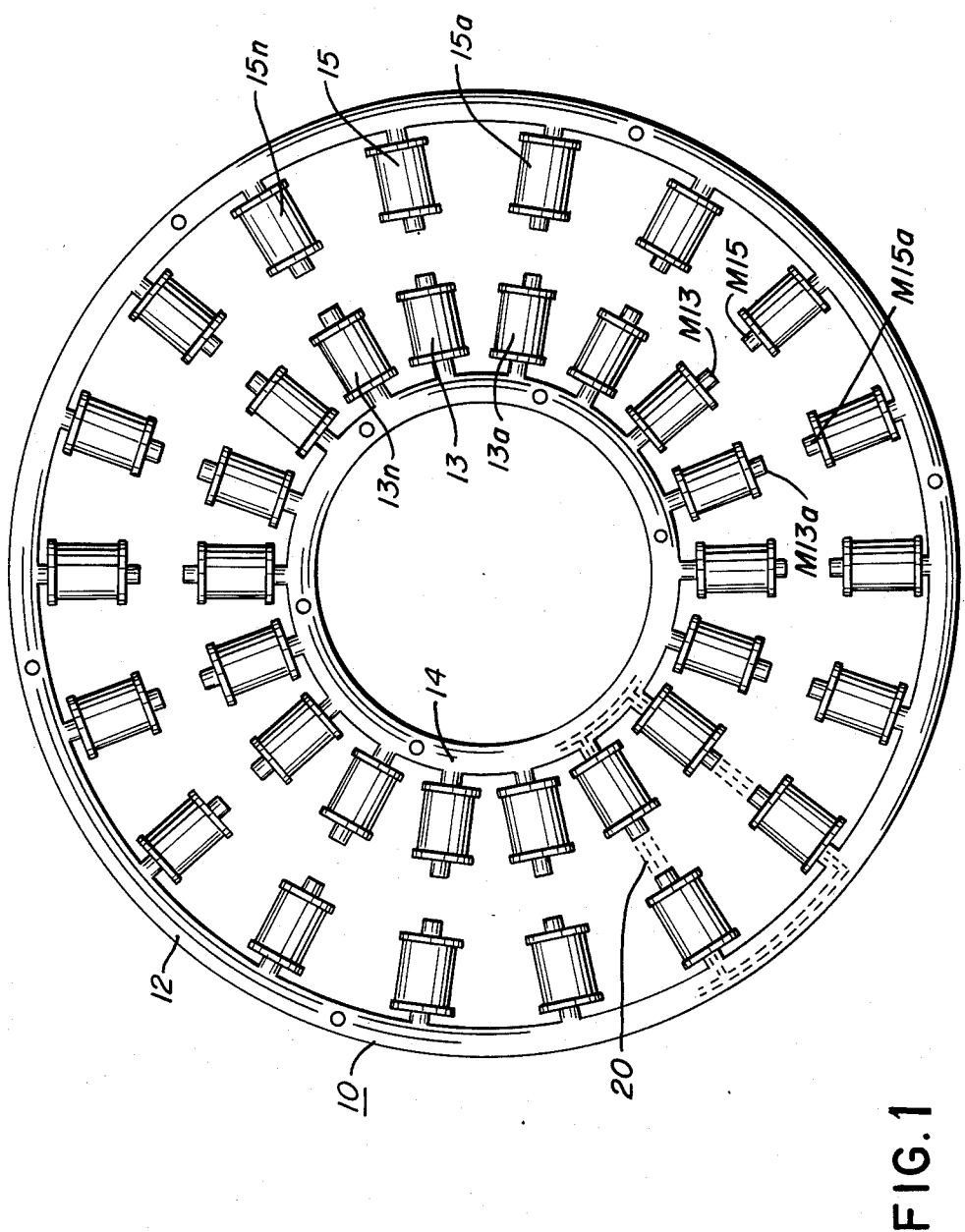
FIG. 1 is a top view illustrating a first and second series of electromagnets positioned on a first and second metallic base plate in a physical relationship to create a magnetic field therebetween.

With particular reference now to the drawings and the figures therein, the basic assembly comprising the electrical generator of the present invention includes a stationary disc 10, a first series of electromagnets 15 positioned about the outer periphery 12 of the disc 10, and a second series of electromagnets 13 positioned about the inner periphery 14 of the disc 10.

The electromagnets 13a xxx 13n and 15a xxx 15n are positioned end-wise in a face-to-face relationship. The magnetic fields of the electromagnets of the complimentary pairs of electromagnets is created in that each successive magnet 13a xxx 13n in the first series are of opposite polarity, and similarly each magnet 15a xxx 15n in the second series is also of opposite polarity. Again, each of the electromagnets of the first series 13a xxx 13n in the complimentary pairs of electromagnets and of the second series of electromagnets 15a xxx 15n, are of opposite polarity.

Upon energization of the first and second series of electromagnets, as set forth below, there is created a magnetic field between each complimentary pair of electromagnets in the first series 13a xxx 13n and 15a xxx 15n, as depicted by field 20.

The outer ring 12 coupling the series of electromagnets 15a xxx 15n and the inner ring 14 coupling the series of electromagnets 13a xxx 13n are each of magnetic material. The magnetic field 20 extends through each magnetic; that is, the magnetic rings 12 and 14 magnetically couple the magnetic fields thereby enhancing the magnetic field between each pair of complimentary magnets. In this way if there are discrepancies in the structures, orientation etc., the inductive coupling rings 12 and 14 of the electromagnets 13 and 15 will integrate and average the magnetic fields. Each magnetic field between the first and second series of electromagnets are now exactly identical. The significane of having identical fields resides in the induced output voltage, a pulse of identical magnitude.

Figure 2:
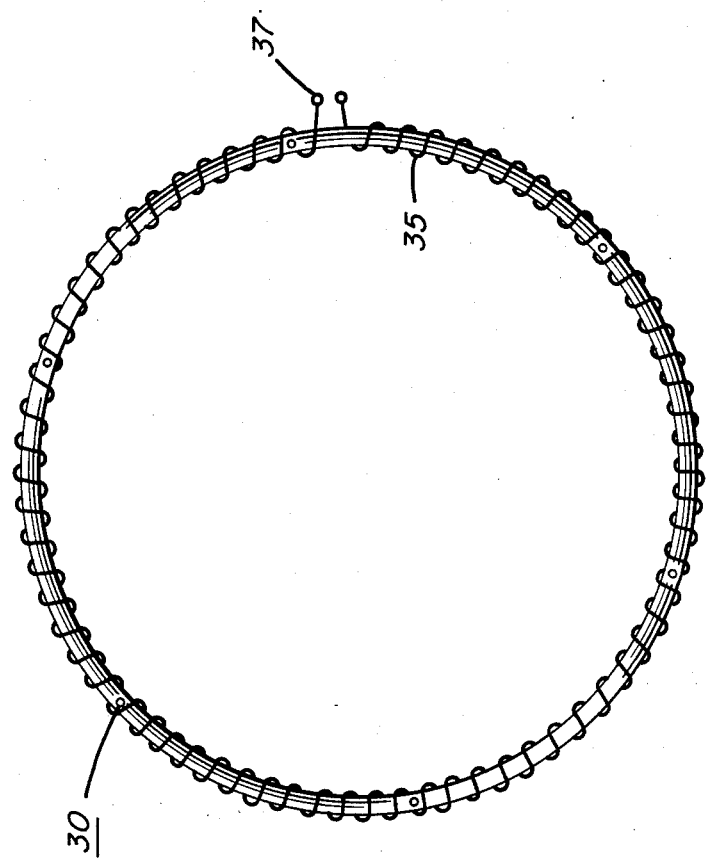
FIG. 2 is a schematic illustration of a non-magnetic ring having a secondary winding wound thereon and FIG. 2A illustrates multiple windings with discrete voltage terminals wound on the ring.

With particular reference to FIG. 2 there is illustrated the winding ring 30 comprising a non-magnetic loop 32 having a conductive wire 35 wound thereon. The number of windings 35 on ring 30 is determined by the desired output at the ring-winding output—within practical limitations. It can be appreciated, the greater the number of turns the greater the induced output voltage at terminals 37.

Figure 2A:
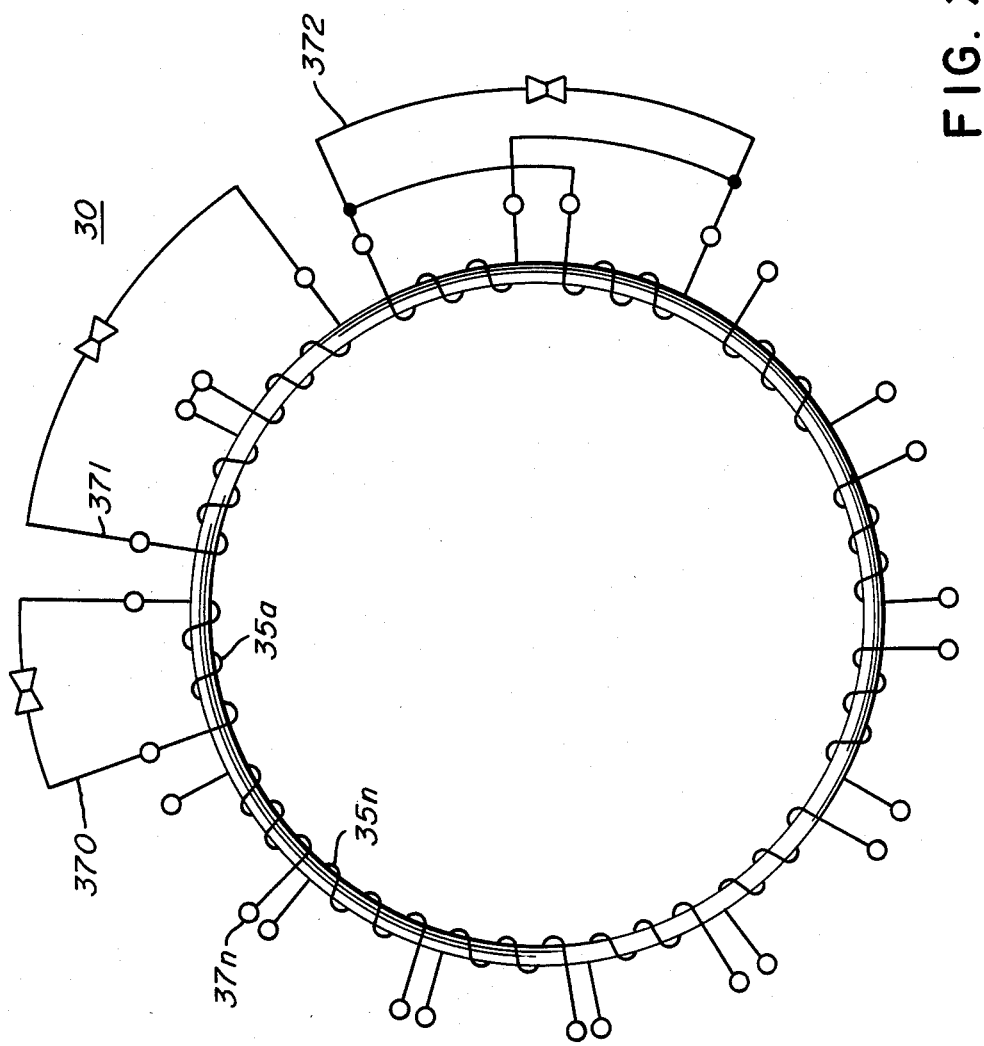

With reference to FIG. 2A there is illustrated the winding ring 30 with more than one winding 35a xxx n thereon. The purpose of windings 35a xxx n as set forth below, is to provide isolated voltage sources for a like number of utilization devices.

The loop may be brass for rigidity and relaibility. The windings 35 may be copper or other highly conductive metallic wire.

Figure 3:
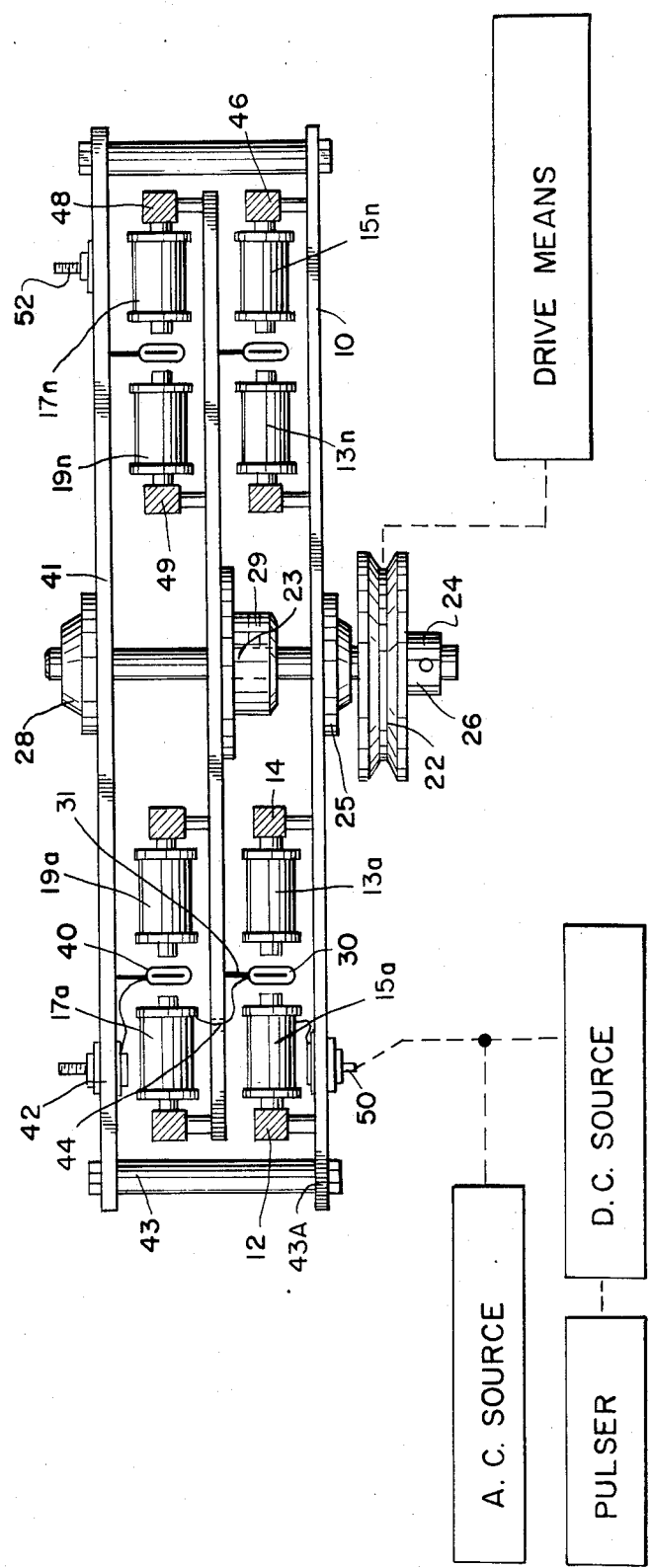
FIG. 3 is a crossectional view of a complete preferred embodiment.

In FIG. 3 there is illustrated in a crossectional side view, a complete operable preferred embodiment of the present invention.

The electromagnets 13a xxx 13n and 15a xxx 15n comprise the outer periphery series of electromagnets and inner circle of electromagnets of FIG. 1. The electromagnets 15a xxx 15n (only two electromagnets visible), are supported by angle brackets 46a xxx 46n. One end of the bracket 46 supports the electromagnet and the other end is secured to the stationary disc 10. Also secured to disc 10 is a voltage terminal 50 for applying an electrical voltage current potential to each of the electromagnets 13a xxx 13n and 15a xxx 15n.

Shown in crossection in FIG. 3 is the winding ring 30 positioned in the gap between electromagnets 13a xxx n and 15a xxx n. The winding ring 30 is supported by support 31 to the underside of rotating disc 44.

Disregarding only for the moment the upper portion of FIG. 3, the fundamental operation of the invention may be described. The electromagnets are positioned end-wise with the inner ring of electromagnets 13a xxx 13n facing the outer ring of electromagnets 15a xxx n. The one magnet will have an end north pole whereas the opposite magnet will be an end south pole. Also, the adjacent magnets will be of opposite polarity.

Upon energizing the electromagnets, via terminal 50, in the gap between electromagnets 13a xxx n and 15a xxx n there will be a magnetic field 20. Considering now that disc 44 is rotating there will be a relative motion between the first and second series of magnets with the winding ring 30 and in consequence the winding ring 30 is traversing the series of magnetic fields 20a xxx n. As the winding ring 30 passes through each of the magnetic fields there will be induced a voltage/current in each of the windings 35a xxx n thereon.

The voltage/current potential induced in the windings 35a xxx n will have a magnitude depending on certain parameters and configurations. As aforesaid the greater the number of turns of the winding ring 35, the greater the magnitude of the induced voltage therein. The strength of the magnetic fields 20a xxx 20n will also be proportionably reflected in the output voltage at terminals 37a xxx n. One factor of that the strength of the magnetic field is directly dependant on is the magnitude of input voltage at terminal 50. Also, the size, configuration and the number of turns on each electomagnet and the number of electromagnets will be directly proportional to strength of the magnetic fields. Finally and perhaps most significantly, is the speed of rotation of the winding ring 30 via rotating disc 44, through the magnetic fields. It can be appreciated an increase in speed results in an increase of speed in traversing the magnetic fields 20a xxx n and thereby a greater voltage induced in winding 35. Also relative to the input voltage, wherein the input voltage is a pulse, the pulse repetition rate will be directly proportional to the magnitude of the voltage output. However since the frequency of the output pulses is dependant on the number of magnetic fields, the frequency of the output pulses remain constant.

In the embodiment of FIG. 3 the speed of rotation is dependant on the speed of the drive to pully 22. The drive consists of shaft 24 having at its lowermost end pully 22, secured thereto and positioned thereon by set washer 26. The shaft 24 passes through bearing 25 connected to the stationary disc 18. The intermediate position of the shaft is secured bia set washer 29 and plate washer 23 to the rotating disc 44. The upper end of shaft 24 extends through the stationary upper disc 41 with the assistance of bearings 28.

The input voltage, the voltage/current applied to the electromagnets via terminal 50, may be either alternating current, or pulsed direct current. The alternating current will have alternate reverse cycles at the output terminal 42. The direct current will result in a direct current output at terminal 42. Since there is induced in winding 35 of ring 30 a voltage only as it passes through one of the magnetic fields, the output voltage at terminal 42 will be a pulsed direct current.

The lower stationary disc 10 and the rotating disc 44 are operable as stated, and with a single magnetic field/coil winding arrangement there will be a step-up in voltage at the output of terminal 42. Also with the rotating disc 44, the output voltage terminals 42 would necessarily include slip-rings, rotating wires, or the like.

With continued reference to FIG. 3, the complete preferred embodiment construction of an embodiment that has no slip-rings, rotating wires, or the like may now be described. In addition to the stationary disc 10 and the rotating disc 44 there is added a second stationary disc 41. The two stationary discs 41 and 10 are maintained in their relative position by stanchions 43 secured at either end to the two discs 10 and 41.

On the upper side of the rotating disc 44 there is fixed thereon a third 17a xxx n and fourth 19a xxx n are positioned on the rotating disc 44. Hence the output of the stationary ring-winding 30 may be readily connected by simple wire 31 as the input to the stationary third 17a xxx n and fourth 19a xxx n series of electromagnets.

In the arrangement of FIG. 3 the voltage induced in the ring 30 is not utilized via an output purpose. In this arrangement, the output voltage induced in first coil winding ring 30 is connected via terminal wire 31 to the input to energize the third and fourth series of electromagnets 17a xxx n and 19a xxx n.

It must be appreciated that the ring-winding 30 and the third and fourth series of electromagnets 17a xxx n and 19a xxx n are positioned on the rotating disc 44. Hence the output of the stationary ring-winding 30 may be readily connected by simple wire 31 as the input to the stationary third 17a xxx n and fourth 19a xxx n series of electromagnets.

As aforesaid, there is wound on winding ring 30 and/or winding ring 40, multiple windings each with its respective output terminals. In certain utilitarian applications there may be multiple devices each requiring its own energization isolated from the other devices. Again, the devices may be of a nature that infinite current would be drawn; hence, the need for current limiting.

In the embodiment of FIG. 3 there are a like number of turns on the winding coils equal to the number of devices. One each output 37a xxx n, at its respective terminal is connected a discrete utilitarian device.

In other utilitarian applications, the particular devices may differ in the requirement for voltage and/or current. Accordingly, the output terminals may be connected in series as shown at 371 or in parallel as shown at 372.

In the embodiment of FIG. 3 there is shown output at terminal 42. This terminal is for a single phase output. In those instances, wherein there are multiple phase outputs terminal 52 shall comprise an equal number of boltage terminals.

In certain other instances, terminal 52 may comprise a more practical arrangement. That is, winding rings 30 and 40 may comprise a fixed number of windings for instance 15; and similarly terminal 52 will comprise 15 taps—one for each winding. Then depending on the application up to 15 voltage outputs may be utilized; or alternatively the series or parallel connections can be made at the taps 521 xxx 535.

The terminal variable voltage output in its most general aspect denotes an arrangement wherein the output voltage may be increased. As described above, increasing the input voltage, the number of turns, and the strength of the magnetic field will increase the voltage output.

In certain other instances, the output voltage is sufficient and there is a need to reduce the output voltage perhaps to zero. One such device is an accelerator wherein the need starts at zero and goes to maximum.

In the preferred embodiment, the input voltage is pulsed to reduce the output voltage. A constant d.c. current source will provide maximum output. By pulsing the input to electromagnets the time period of the pulse on relative to number of output pulses is lessened. If the number of input pulses is very small—hence short duty on the voltage of the constant number (frequency does not change) of output pulses will be drastically reduced. One such practical application would be idling speed of an automobile.

Figure 3A:
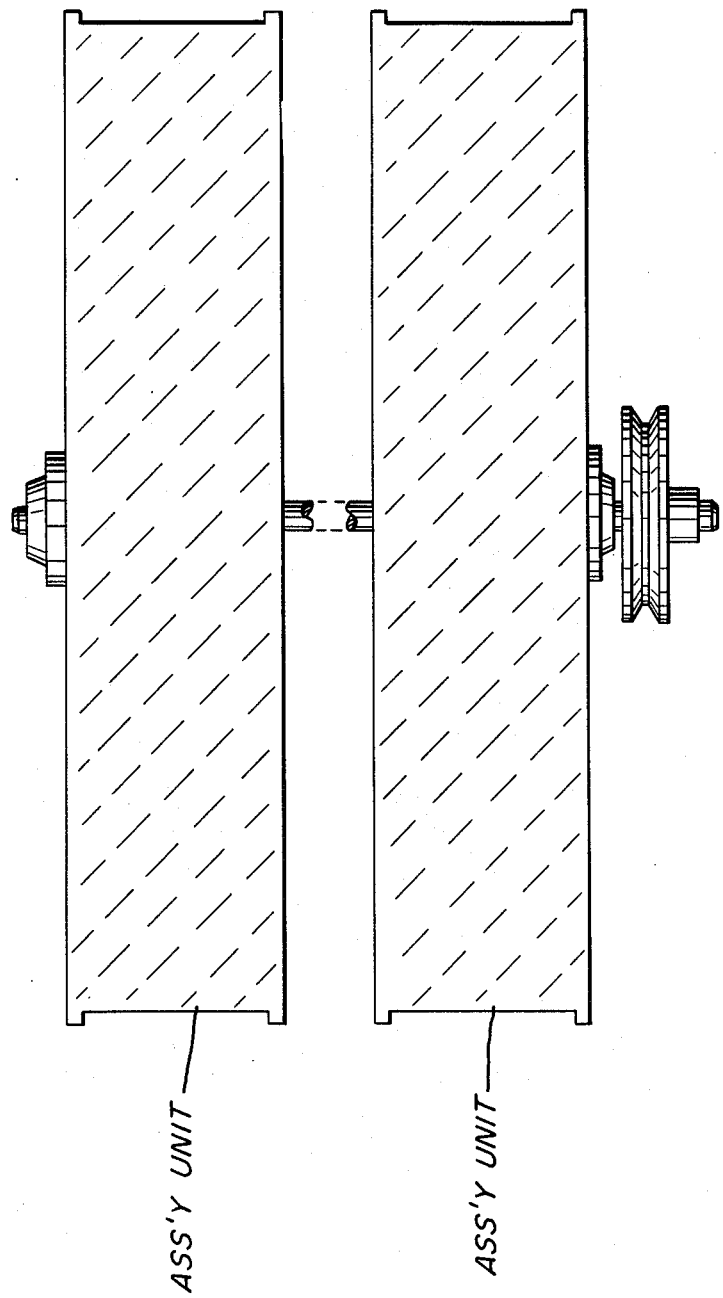
FIG. 3A is a partial illustration of the systems of claim 3 that have been cascaded.

With continued reference to FIG. 3 and now FIG. 3A, it can be appreciated any practical number of series of electromagnets and winding rings may be added in cascade for multiple increases in power, Since each complimentary unit is a voltage amplification in itself each additional cascaded arrangement will provide a greater voltage at a geometrical ratio—not arithmetical.

In the embodiment of FIG. 3, in the lower portion its electromagnets are fixed and the winding is moved. Whereas in the upper portion the winding is fixed and the electromagnets are moved. It can be appreciated that the essential concern is that there be a relative motion between electromagnets and the winding ring. That which is fixed and that which is moving is irrelevent. Either or both can be moving.

Again, discs and rotating discs are shown for simplicity and they are amenable to rotation by a motion drive. It must be understood, other directional movement to obtain the relative motion between electromagnets and windings is within the scope of the invention.

As can now be understood there is transferred from a low energy input a high output voltage. But yet, there is power isolation, and current is limited to that of the particular winding. There cannot be a greater current drawn; hence the arrangement is an inherent current limiting voltage source.

Significantly, the preferred embodiments do not have opposing magnetic fields or sources, there are no electrical contacting parts, and no restraints. Hence, the input voltage after startup, can be significantly small in comparison to output.

I claim:

1. An electrical generator comprising:
 a base member,
 a first series of electromagnets positioned thereon,
 a second series of electromagnets positioned on said base member in a face-to-face relationship woth said first series,
 each of said first series of electromagnets and its second series complimentary magnets having opposite polarity, and means to energize said first and second series of electromagnets to create a magnetic field therebetween,
 a non-magnetic ring having windings wound thereon,
 said ring positioned between said first and second series of electromagnets on a second base member;
 means for imparting a relative motion between said electromagnets and said ring comprising a rotatable shaft extending through said first base member and connected to said second base member;
 said motion causing said ring/winding to traverse said magnetic fields between said electromagnets, thereby inducing a voltage/current in said windings; and
 a pair of terminals on said winding, and
 means connected to said winding terminals for utilization of said induced voltage/current.

2. The electrical generator of claim 1 wherein said means to energize said electromagnets is an electrical source of alternating current, and wherein the voltage frequent output at said winding terminals is a series of waveforms of like polarity.

3. The electrical generator of claim 1 wherein said means to energize said electromagnet is an electrical source of direct current, and wherein the voltage/current output at said winding terminals is a series of pulses.

4. The electrical generator of claim 1 wherein said means to energize said electromagnet is a variable electrical source, and wherein;
 said voltage/current output at said winding terminals is directly proportional in amplitude to said energization input.

5. The electrical generator of claim 1 wherein said magnetic field between said electromagnets is related to the number of turns on said electromagnets.

6. The electrical generator of claim 1 wherein said base member is a disc and wherein said first series of electromagnets are positioned in an outer circle and said second series of electromagnets are positioned in an inner circle on said base;
 wherein said second base member has positioned thereon said winding ring,
 and means for imparting a relative motion between said first and second base member.

7. The electrical generator of claim 6 wherein said first base member is fixed in position and wherein said second base member is rotatable.

8. The electrical generator of claim 6 further comprising:
   a third base member fixedly positioned above said rotatable second base member,
   a third series of electromagnets positioned in an outer circle on said third base member,
   a fourth series of electromagnets positioned in an inner circle on said third base member in a face to face relationship with said third series of electromagnets,
   each of said third series electromagnets and its complimentary fourth series of electromagnets having opposite polarities, and
   means for connecting said voltage/current from said first ring-winding to energize said third and fourth series of electromagnets to create a magnetic field therebetween;
   a non-magnetic rings second ring having windings wound thereon,
   a pair of terminals on said winding, and
   said second ring mounted on said third base member and extending said third base member and extending downwardly therefrom in a position between said electromagnets;
   said second ring-winding, upon rotation of said second base member, traverses said magnetic fields between said third and fourth series of electromagnets, thereby inducing a voltage/current in said windings; and
   means connected to said second ring-winding terminals for utilization of said induced voltage/current.

9. The electrical generator of claim 8 wherein said third and fourth series of electromagnets has a greater number of turns than that of said first and second series of electromagnets, and
   wherein said voltage/current at said terminals of said second ring-windings is proportional to the number of turns on said third and fourth windings.

10. The electrical generator of claim 4 wherein said voltage/current at said second ring-winding terminals is directly proportional in amplitude to the amplitude of said voltage/current at said first ring-winding terminals.

11. The electrical generator of claim 7 further comprising pairs of electromagnets in cascade with said first/second and third/fourth series of electromagnets, and wherein said rotatable shaft interconnects said cascaded electromagnets.

12. An electrical generator comprising:
   a base
   a first and second series of electromagnets positioned on said base creating a magnetic field therebetween,
   a coil winding mounted between said first and second series of electromagnets,
   means for moving said coil winding relative to said electromagnets comprising a rotatable shaft connected to said base member,
   said coil winding mounted between said first and second series upon movement traversing said magnetic field and inducing a voltage current therein; and
   a third and fourth series of electromagnets, a second coil winding positioned therein,
   wherein said means for moving said coil winding relative to said magnets further comprises moving said third and fourth series of electromagnets relative to said second coil winding,
   means for utilizing said induced voltage/current in said windings.

13. The electrical generator of claim 12 further comprising, electrical means for energizing said electromagnets and wherein said electrical means is an alternating current.

14. The electrical generator of claim 12 further comprising, electrical means for energizing said electromagnet, and wherein said electrical means is a direct current.

15. The electrical generator of claim 12 wherein said positioning of said first and second electromagnets comprise positioning said first series in an outer circle and said second series in an inner circle; and, wherein said mount for said coil winding is a ring between said first and second series of electromagnets.

16. The electrical generator of claim 12 wherein said means for moving said third and fourth series of electromagnets further has mounted thereon said first coil winding.

17. The electrical generator of claim 12 further comprising means for connecting said induced voltage/ucrrent in said first coil winding to said third and fourth series of electromagnets.

18. The electrical generator of claim 13 further comprising pairs of series of electromagnets in cascade with said first/second and third/fourth series of electromagnets and a coil winding for each of said pairs, and movable means interconnecting each of said pairs of electromagnets for moving each of said coil windings relative to said pairs of windings.

19. The electrical generator of claim 6 wherein said first base member comprises a magnetic outer ring and an inner ring member, said quter ring member interconnecting said first series of electromagnets and said inner ring member interconnecting said second series of electromagnets.

20. The electrical generator of claim 12 wherein said direct current is a pulse direct current, and means for varying said direct current to reduce the voltage output of said winding.

* * * * *